(12) United States Patent
Koenig

(10) Patent No.: US 6,930,265 B2
(45) Date of Patent: Aug. 16, 2005

(54) METHOD AND SYSTEM FOR ACOUSTIC FUNCTION CONTROL IN MOTOR VEHICLES

(75) Inventor: Winfried Koenig, Pfinztal (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 10/089,384

(22) PCT Filed: May 10, 2001

(86) PCT No.: PCT/DE01/01772

§ 371 (c)(1),
(2), (4) Date: Jul. 17, 2002

(87) PCT Pub. No.: WO02/09978

PCT Pub. Date: Feb. 7, 2002

(65) Prior Publication Data

US 2003/0020600 A1 Jan. 30, 2003

(30) Foreign Application Priority Data

Jul. 29, 2000 (DE) ........................................ 100 37 023

(51) Int. Cl.⁷ ................................................ H01H 9/00
(52) U.S. Cl. ........................ 200/308; 704/270; 704/275
(58) Field of Search ........................ 200/308; 704/270, 704/272, 273, 274, 275, 271, 210, 225, 226

(56) References Cited

U.S. PATENT DOCUMENTS

| | | | | |
|---|---|---|---|---|
| 4,520,501 A | * | 5/1985 | DuBrucq | 704/271 |
| 5,950,166 A | * | 9/1999 | Hab-Umbach et al. | 704/275 |
| 6,230,132 B1 | * | 5/2001 | Class et al. | 704/270 |
| 6,240,347 B1 | * | 5/2001 | Everhart et al. | 701/36 |
| 6,493,670 B1 | * | 12/2002 | Croft | 704/270 |
| 6,496,107 B1 | * | 12/2002 | Himmelstein | 340/426.1 |
| 6,505,159 B1 | * | 1/2003 | Theodore | 704/270 |
| 6,697,721 B2 | * | 2/2004 | Arlinsky | 701/36 |
| 6,804,653 B2 | * | 10/2004 | Gabel | 704/270 |

FOREIGN PATENT DOCUMENTS

| | | |
|---|---|---|
| EP | 0 794 089 | 9/1997 |
| EP | 0 856 432 | 8/1998 |
| EP | 0 963 876 | 12/1999 |
| FR | 2 570 037 | 3/1986 |

* cited by examiner

*Primary Examiner*—Richard K. Lee
(74) *Attorney, Agent, or Firm*—Kenyon & Kenyon

(57) ABSTRACT

In a method and a control system for acoustical function control in a motor vehicle using a speech input system that receives a spoken command and converts it into corresponding control signals, the system is activated by an operating element that is actuated manually and, upon being actuated, outputs to an operating person an indication of its readiness to receive a voice command. The indication is effected by a mechanical deflection from a preestablished position of the operating element, or a part thereof, so as to directly influence the tactile sense of the operating hand of the operating person.

5 Claims, 1 Drawing Sheet

DRIVER
PRESSES
KEY

SLIDING
HEAD
RASIED

SPEECH
INPUT
READINESS

LOWERED

T

VOICE
COMMAND
OF THE USER
VIA
MICROPHONE 16

METHOD AND SYSTEM FOR ACOUSTIC FUNCTION CONTROL IN MOTOR VEHICLES

FIELD OF THE INVENTION

The present invention relates to a method and a control system for acoustical function control in a motor vehicle using a speech input system that receives spoken commands and converts them into corresponding control signals, the system being activated by an operational element that is manually activated and, upon being activated, outputting to an operating person the indication of readiness to receive a spoken command.

BACKGROUND INFORMATION

Currently, speech input systems must be activated by the user shortly before the inputting of a relevant voice command. A so-called "Push-To-Talk" activation of this type is usually performed by a push-button on the steering wheel rim. The system must signal back to the user when it is ready to respond to his command, i.e., provide a readiness indication. It is conventional to realize this indication of readiness using a color change of an optical symbol on a display or using a short, one-time tone. Because in actual urban driving, the use of voice inputting is usually a secondary task, after the sate driving of the vehicle, and the driver is often subject to significant mental stress by the actual task of driving, he may overlook the optical symbol indicator on the display, it is possible for him not to hear the acoustical check-back signal, or he may forget that the check-back signal has already occurred. As a result, he is uncertain with regard to the condition of the system, which can lead to operating errors, faulty functioning, and consequently to a lack of acceptance by the user of a function control system that operates on the basis of voice input in a motor vehicle.

SUMMARY

It is an objective of the present invention to provide a method and a control system such that voice-input function control in the motor vehicle is simplified and its functional reliability increased. At the same time, a goal is to achieve clarity in a simple manner concerning the condition of the system without requiring a glance and without annoying the passengers, and to increase the acceptance of speech input systems of this type for function control in a motor vehicle.

It is also an objective of the present invention to provide a combined operating/indicator element that is suitable for the control system according to the present invention.

As a result of the fact that the indication of the readiness condition is effected by a mechanical deflection from a preestablished position of the combined operating/indicator element, or a part thereof, in an immediate response to the tactile sensation of the operating hand of the operating person, the driver is constantly informed concerning the condition: Ready or Not Ready of a speech input system, without having to cast his glance at a particular display. In addition, in this manner, the correct time for a voice command may be clearly signaled to the driver so that the recognition rate of the voice recognition in the speech input system is improved.

After a valid voice command is recognized, the control system for its part may indicate that it is at present no longer ready to input a further command. For this purpose, the combined operating/indicator element, or the part thereof, may once again be set in its original condition.

The readiness indication as a result of the mechanical deflection of the operating/indicator element, or a part thereof, may be effected statically, in that the operating/indicator element, or part thereof, experiences a static change in shape or position during the readiness condition of the control system.

In an example embodiment, if the operating/indicator element is embodied by a switch or key on the steering wheel rim, it is possible, for indicating readiness, to recess the push-button or the sliding head of the key or switch, which was pressed by the driver to activate system, so far into the housing that the finger of the operating hand senses a depression or opening in the housing. This static change in shape of the operating/indicator element suggests to the user that the system is "opened" like a door. This analogy may be taken even further if the operating/indicator element is given the shape, e.g., of a raised ear, and the readiness to hear, i.e., to receive a spoken command, is signaled by a lowering of the ear. This, in turn, is brought about by the control system.

An alternative possibility is not to change the shape or position of the operating/indicator element, or a part thereof, statically during readiness, but to set the operating/indicator element, or a part thereof, in vibration to indicate readiness. In the meaning of the present invention, a vibration may also be understood as a deflection of the operating/indicator element or a part thereof.

According to one example embodiment, the combined operating/indicator element is a key or switch that may be installed on the steering wheel of a motor vehicle, the movable part of which, i.e., the key or switch sliding head, is placed in vibration or is moved in order to indicate the readiness condition using an electromotor, electromagnetic, or piezoelectrical actuator organ located in the interior of the operating/indicator element. In place of this, it is also possible to use other conventional actuators.

Below, on the basis of the drawing, an example embodiment of the method according to the present invention and of the control system are described, as well as a combined operating/indicator element configured for the control system.

DETAILED DESCRIPTION

Figure 1:
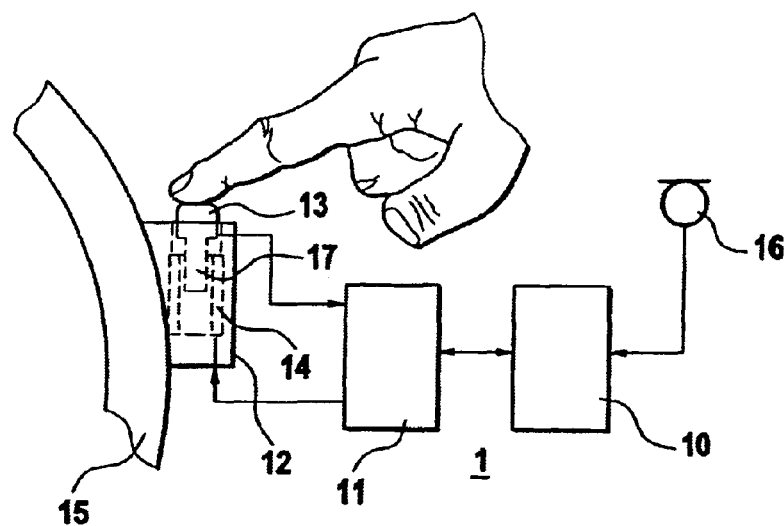
FIG. 1 schematically illustrates a basic system structure of a control system for acoustical function control in accordance with the present invention.

FIG. 1 illustrates schematically and in the form of function blocks a control system for acoustical function control in a motor vehicle, generally designated as reference numeral 1. Via a microphone 16, a speech input system that is made up of a voice recognition block 10 and a control block 11, control system 1 in the activated condition may receive spoken commands from an operating person and may convert them into control signals for controlling various functions in the motor vehicle as well as, if appropriate, also around the motor vehicle.

Before the input of a relevant voice command by the user, the system is activated by the pressure of the finger of his hand on a key or switch sliding head 13 of a key or switch 12 secured on steering wheel rim 15, the key pressure or switching operation being conveyed to control block 11 of system 1 as an activating signal.

Control block 11, illustrated in FIG. 1, functions to control voice recognition block 10, to activate microphone 16, to input the switching condition of operating element 12, and to actuate the sliding head for the readiness indication, or for triggering the vibration.

System 1, or control block 11 of the speech input system, signals back to the user when it is ready to respond to his voice command, i.e., it delivers a readiness indication. For this readiness indication, after combined operating/indicator element 12 has been actuated by the user, e.g., through finger pressure, to activate the system, the element is brought by control block 11 of system 1 into a condition which may be detected by the same finger, or by other parts of the hand of the user in a direct tactile manner. For this purpose, in the example embodiment, sliding head 17 of key 13, extending into the interior of operating/indicator element 12, which was pressed by the driver for the purpose of activation, is retracted, e.g., by an electromagnet 14 upon a signal from control block 11, so far into the housing of operating element 12 that the finger senses a depression or opening in the housing. A signaling of this type for the readiness condition clearly suggests to the user that the system is "opened" like a door.

As indicated above, this analogy may be taken even further, by giving to the combined operating/indicator element the shape of an ear and by signaling the readiness of the system to respond, i.e., to accept voice commands, by a lowering of the ear.

In place of using an electromagnet or electromotor 14 in the interior of operating/indicator element 12, for retracting and holding sliding head 17 of key 13 in the interior of the housing, it may also be possible to use piezo actuators and other similar conventional actuators.

An alternative configuration may set key 13 in vibration in order to indicate readiness. In this case as well, the operating/indicator element, during the readiness of system 1, experiences a mechanical deflection, which is detectable as vibration in a directly tactile manner.

The function-time diagrams illustrated in FIGS. 2A–2C indicate in principle the time curve of functions of the version of control system 1 illustrated in FIG. 1, the operating/indicator element of which is furnished with projecting/retracting key 13 and sliding head 17.

Figure 2:
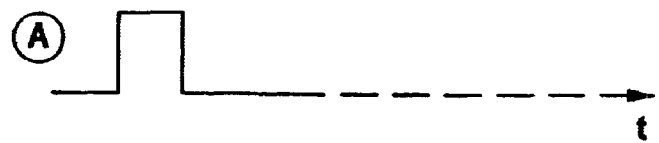
FIGS. 2 A–C are function-time diagrams, which illustrate the basic time curve of the functions of the control system illustrated in FIG. 1.
Figure 2:
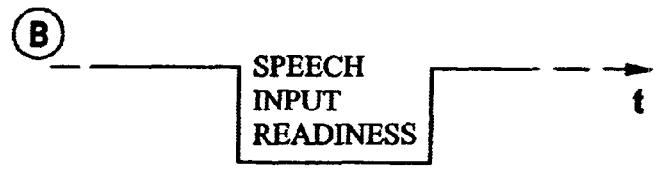
Figure 2:
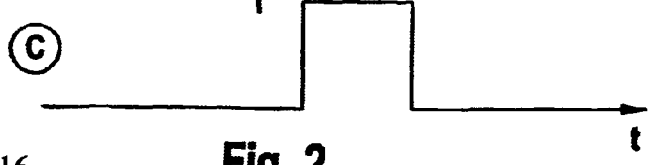

Part A of FIG. 2 illustrates the activation of key 13 of operating/indicator element 12 by the finger of the user, the closing of the contact of the key, the inputting into control block 11, and the activating of voice recognition block 10. In central part B, FIG. 2 illustrates that, after the is activation, the system signals its voice input readiness by retracting sliding head 17 and with it key 13 into the housing of operating/indicator element 12. Double arrow T thus indicates duration T of the readiness condition of the system. During readiness condition T, the user may input a voice command into system 1 via microphone 16 in accordance with lower part C of FIG. 2. Voice recognition block 10 recognizes the spoken command and converts it into corresponding control signals for various control tasks inside the motor vehicle or optionally outside the motor vehicle (e.g., opening a garage door).

After the voice command of the user input into microphone 16 has been recognized by voice recognition block 10 and has been converted into the corresponding control signals, system 1 once again indicates via control block 11 and operating/indicator element 12 that it is at present no longer ready for the inputting of a further command. For this purpose, in accordance with central part B of FIG. 2, operating/indicator element 12, or its key 13, is once again set in its original condition. In the illustrated example embodiment, the head of key 13 once again extends out of the housing of the operating/indicator element. In an alternative example embodiment, the vibration of the key then ceases.

In the example method according to the present invention for acoustical function control in a motor vehicle, illustrated above by way of example, as well as in the control system configured for this purpose, the driver may be constantly informed concerning the condition of the speech input system, without having to specially direct his glance to a display. The driver may therefore direct his eyes and attention to the events on the road, parallel to inputting a spoken command. The driver senses through his hand in a direct, tactile manner the correct time for a voice command, as a result of which the recognition rate of the speech input system is not impaired.

The driver may always form a correct picture of the condition of the speech input system, so that he feels more secure in the dialogue with the speech input system and is no longer hampered in his driving performance by irritation. Passengers are not affected by this form of providing information.

What is claimed is:

1. A method for acoustical function control in a motor vehicle using a speech input system configured to receive a spoken command and to convert the spoken command into corresponding control signals, comprising the steps of:

activating the system by manually actuating an operating element; and outputting to an operating person an indication of readiness of the system to receive a voice command by mechanically deflecting from a preestablished position of one of the operating element and a part thereof, so as to directly influence a tactile sense of an operating hand of the operating person.

2. The method according to claim 1, wherein the deflection is automatically one of ceased and reset, if a readiness condition of the speech input system no longer exists after activation.

3. The method according to claim 1, wherein the readiness indication includes a static shape change of one of the operating element and a part thereof.

4. The method according to claim 1, wherein the readiness indication includes a position change of one of the operating element and a part thereof.

5. The method according to claim 1, wherein the readiness indication includes a vibration of one of the operating element and a part thereof.

* * * * *